(12) United States Patent
Lin

(10) Patent No.: US 10,510,086 B2
(45) Date of Patent: Dec. 17, 2019

(54) POPULAR PRODUCT ANALYSIS SYSTEM

(71) Applicant: LINCTRONIX LTD., New Taipei (TW)

(72) Inventor: Yu-Shun Lin, New Taipei (TW)

(73) Assignee: LINCTRONIX LTD., New Taipei (TW)

(*) Notice: Subject to any disclaimer, the term of this patent is extended or adjusted under 35 U.S.C. 154(b) by 329 days.

(21) Appl. No.: 15/660,605

(22) Filed: Jul. 26, 2017

(65) Prior Publication Data

US 2018/0033029 A1    Feb. 1, 2018

(30) Foreign Application Priority Data

Jul. 27, 2016  (TW) .............................. 105123700 A

(51) Int. Cl.
| | |
|---|---|
| *G06Q 30/02* | (2012.01) |
| *H04W 4/029* | (2018.01) |
| *H04W 4/80* | (2018.01) |
| *H04W 4/02* | (2018.01) |
| *G06F 21/35* | (2013.01) |
| *G06F 21/55* | (2013.01) |

(Continued)

(52) U.S. Cl.
CPC ......... *G06Q 30/0201* (2013.01); *G06F 21/35* (2013.01); *G06F 21/552* (2013.01); *G06Q 30/0254* (2013.01); *H04W 4/02* (2013.01); *H04W 4/029* (2018.02); *H04W 4/23* (2018.02); *H04W 4/80* (2018.02); *H04W 4/027* (2013.01); *H04W 4/35* (2018.02)

(58) Field of Classification Search
CPC .................................. G06Q 30/02; G06K 7/10
See application file for complete search history.

(56) References Cited

U.S. PATENT DOCUMENTS

2007/0282693 A1* 12/2007 Staib ...................... G06Q 30/02
                                                                  705/26.5
2011/0077909 A1*  3/2011 Gregory ................. G01D 9/005
                                                                   702/187

(Continued)

FOREIGN PATENT DOCUMENTS

| CN | 105320653 | 2/2016 |
|---|---|---|
| CN | 105590229 | 5/2016 |

(Continued)

*Primary Examiner* — Vincent M Cao
(74) *Attorney, Agent, or Firm* — Klintworth & Rozenblat IP LLP

(57) ABSTRACT

The present invention discloses an analysis system for analyzing the popularity of a target product. The popular product analysis system comprises an analysis server, a Bluetooth tracking device, a wireless base station, and a mobile device. The Bluetooth tracking device is configured on the target product. When the product was moved by non-specific consumers, the Bluetooth tracking device is for generating a product movement Bluetooth signal. The analysis server is for receiving the product movement Bluetooth signal through a wireless base station or a mobile device. According to the product movement Bluetooth signal, the analysis server can determine the popularity of the target product and the consumer information for providing a better location for storing target products and shopping suggestions for consumers.

20 Claims, 4 Drawing Sheets

(51) Int. Cl.
*H04W 4/23* (2018.01)
*H04W 4/35* (2018.01)

(56) References Cited

U.S. PATENT DOCUMENTS

| | | | |
|---|---|---|---|
| 2013/0284806 A1* | 10/2013 | Margalit | G06Q 30/06 235/382 |
| 2014/0100999 A1* | 4/2014 | Mountz | G06Q 10/087 705/28 |
| 2014/0148196 A1* | 5/2014 | Bassan-Eskenazi | G06K 7/10297 455/456.1 |
| 2014/0351068 A1* | 11/2014 | Renfroe | G06Q 30/0641 705/15 |
| 2016/0055360 A1* | 2/2016 | Haugarth | G06Q 30/0201 340/10.1 |

FOREIGN PATENT DOCUMENTS

| | | |
|---|---|---|
| TW | I528306 | 4/2016 |
| WO | 2015134761 A1 | 9/2015 |

\* cited by examiner

POPULAR PRODUCT ANALYSIS SYSTEM

CROSS-REFERENCE TO RELATED APPLICATIONS

This application claims priority to Taiwan Patent Application No. 105123700 filed on Jul. 27, 2016, which is hereby incorporated by reference in its entirety.

BACKGROUND OF THE INVENTION

Field of the Invention

The present invention relates to a popular product analysis system, more particularly, relates to a popular product analysis system for detecting the movement of a target product by the sensing technology and transmitting the data to a Bluetooth base station or a mobile device using a Bluetooth, and transmits the data to the analysis server by a mobile device or a Bluetooth base station to perform a data analysis.

Description of the Prior

In the prior art, popular product analysis methods are mostly based on the product online marketing voting or times of the sharing. Users can request the connections with one or more servers via electronic devices through public networks, telephone networks, television networks, data networks, regional networks, wireless networks, Internet, Bluetooth or infrared, and to vote or share the online marketing products with other users by web browsers or applications of the electronic devices. The server side can be counted by the number of votes or the number of sharing as a basis for popular products. However, the method cannot be effectively interpreted as a real popular product because there may be a vicious vote or vicious sharing caused by data misjudgment.

Another popular product analysis method of the prior art is the consumer product memorandum statistical method. Consumers can pre-select the product to be purchased before purchase by a mobile device with the software provided by the merchant. The software provides the store guide road map and the current preferential merchandise information after the consumer enters into the mall. When the consumer is close to the product to be purchased, the Bluetooth transmission device on the merchandise will send a message to the consumer's mobile device, to suggest that the consumer has reached the location where he wants to buy the product, so that the shopping becomes more convenient and achieves marketing effect as well. The software also sends the prompt message of the consumers' completion of the purchased product to the analysis server, and the analysis server can obtain the statistics of the popularity of each product based on the prompt message. Although this method can get the consumer shopping information, it cannot know the consumer temporary purchase of products, and also cannot know the shopping information of the consumer who does not uses the software. Thus, the method of getting the shopping information is not complete.

The analysis technology of using on-site detection of popular product is mostly conducted by the image recognition technology. However, the image recognition technology depends on the camera to read the image, which is prone to visual dead ends or miscarriage of justice. In addition, the density and the set-up location of the cameras also affect the accuracy of the analysis, which results in the needs for on-site tuning.

Thus, the above-mentioned prior art is not a good design, and a lot of missing still needs to be improved. In view of the above, the present invention will provide a non-image recognition technique for popular product analysis.

SUMMARY OF THE INVENTION

The invention is to provide a popular product analysis system. In an embodiment of the present invention, the popular product analysis system for analyzing the popularity of a target product comprising an analysis server, a Bluetooth tracking device, a wireless base station, and a mobile device. The Bluetooth tracking device is configured on a target product, comprising a motion detection sensor for detecting the movement of the target product, wherein, the Bluetooth tracking device transmits at least one product movement Bluetooth signal when the target product is moved. The wireless base station is configured around the target product for receiving the product movement Bluetooth signal and transmitting a wireless product tracking data to the analysis server. The mobile device is for receiving the product movement Bluetooth signal transmitted by the Bluetooth tracking device when the target product is moved by the user of the mobile device, and transmitting a mobile product tracking data to the analysis server. Wherein, the analysis server generates an analysis information of the target product by performing a data analysis based on the received wireless product tracking data and the mobile product tracking data.

In another embodiment of the present invention, the popular product analysis system for analyzing the popularity of a target product comprises an analysis server, a Bluetooth tracking device and a wireless base station. The Bluetooth tracking device is configured on a target product, comprising a motion detection sensor for detecting the movement of the target product, wherein, the Bluetooth tracking device transmits at least one product movement Bluetooth signal when the target product is moved. The wireless base station is configured around the target product for receiving the product movement Bluetooth signal and transmitting a wireless product tracking data to the analysis server. Wherein, the analysis server generates an analysis information of the target product by performing a data analysis based on the received wireless product tracking data.

In another embodiment of the present invention, the popular product analysis system for analyzing the popularity of a target product comprises an analysis server, a Bluetooth tracking device and a mobile device. The Bluetooth tracking device is configured on a target product, comprising a motion detection sensor for detecting the movement of the target product, wherein, the Bluetooth tracking device transmits at least one product movement Bluetooth signal when the target product is moved. The mobile device is for receiving the product movement Bluetooth signal transmitted by the Bluetooth tracking device when the target product is moved by the user of the mobile device, and transmitting a mobile product tracking data to the analysis server. Wherein, the analysis server generates an analysis information of the target product by performing a data analysis based on the received the mobile product tracking data.

In addition, the popular product analysis system of the present invention can interpret the Bluetooth received signal strength indicator by performing a product tracking app on the mobile device. If the Bluetooth received signal strength indicator is greater than a set value, it is determined that the product movement Bluetooth signal is triggered by the user of the mobile device, and then the network connection with the analysis server is established and the mobile product tracking data is transmitted.

Compared with the prior art, the popular product analysis system of the present invention uses the analysis server to interpret the times and the time of the target product is moved corresponding to the stores location and types, and uses a mobile product tracking data transmitted by the mobile device or a wireless product tracking data transmitted by the wireless base station to analyze the popularity of the target product. The popular product analysis system of the present invention provides a proposal for the store to adjust the product location and the item, analyzes the attribute of the user of the mobile device, and broadcasts an advertisement message to the consumer by an advertisement broadcasting mechanism.

The advantages and spirits of the invention can be understood by the following recitations together with the appended drawings.

BRIEF DESCRIPTION OF THE APPENDED DRAWINGS

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
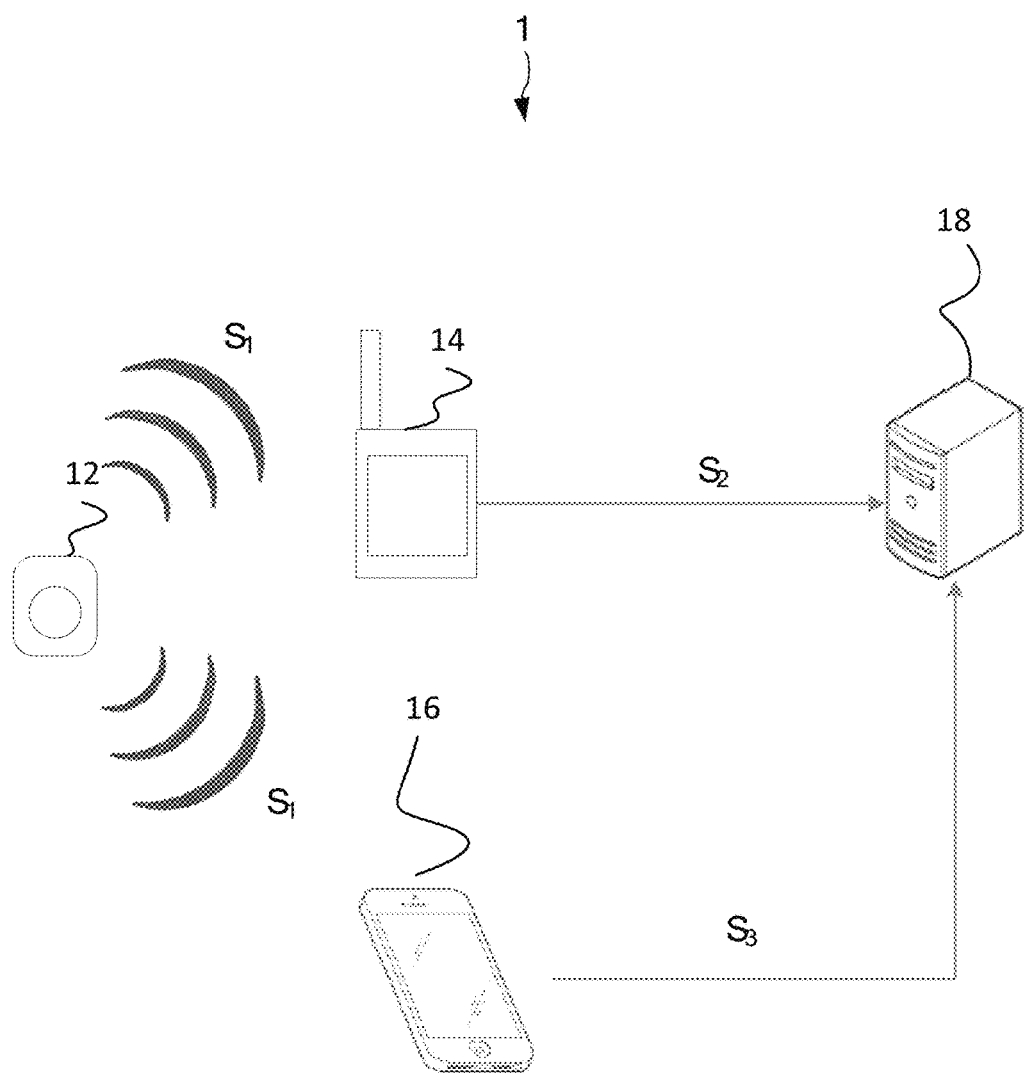
FIG. 1 shows a schematic diagram of the first embodiment of the popular product analysis system of the present invention.
Figure 2:
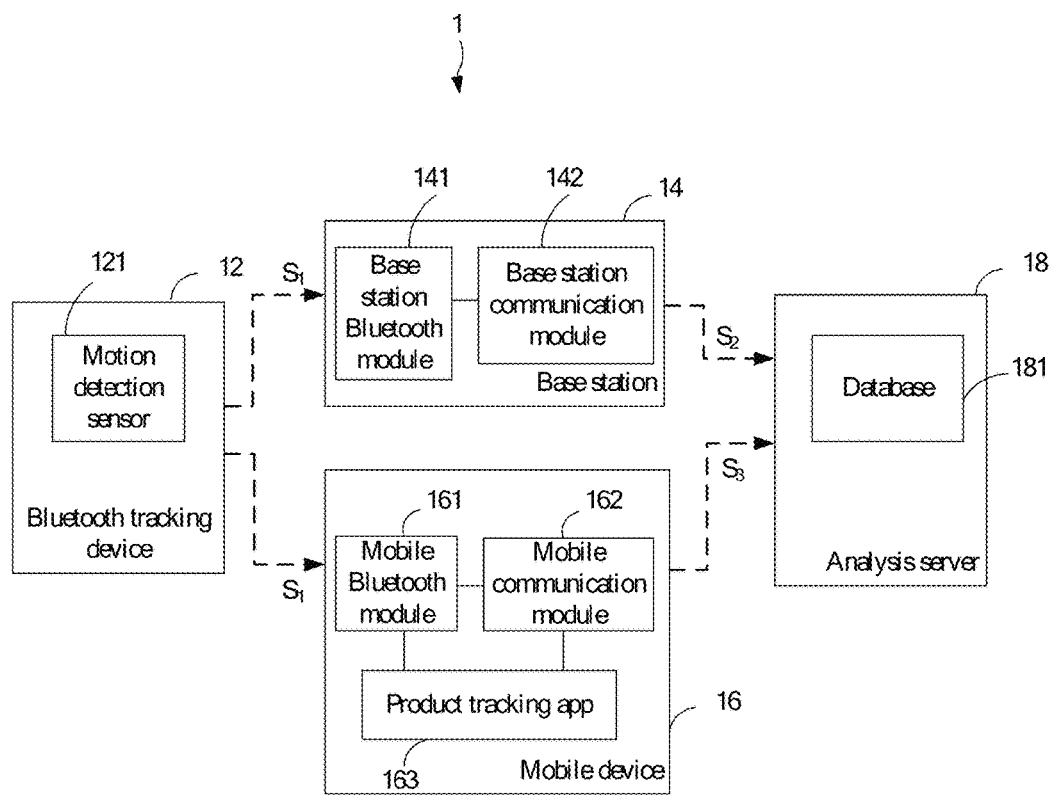
FIG. 2 shows a function block diagram of the first embodiment of the popular product analysis system of the present invention.

Please refer to FIG. 1 and FIG. 2. FIG. 1 shows a schematic diagram of the first embodiment of the popular product analysis system 1 of the present invention. FIG. 2 shows a function block diagram of the first embodiment of the popular product analysis system 1 of the present invention. In the first embodiment of the present invention, the popular product analysis system 1 of the present invention comprises a Bluetooth tracking device 12, a wireless base station 14, a mobile device 16 and an analysis server 18. The Bluetooth tracking device 12 is configured on a target product comprising a motion detection sensor 121 for detecting the movement of the target product, wherein, the Bluetooth tracking device 12 transmits at least one product movement Bluetooth signal S1 when the target product is moved. The wireless base station 14 is configured around the target product for receiving the product movement Bluetooth signal S1 and transmitting a wireless product tracking data S2 to the analysis server 18, The mobile device 16 for receives the product movement Bluetooth signal S1 transmitted by the Bluetooth tracking device 12 when the target product is moved by the user of the mobile device 16, and transmits a mobile product tracking data S3 to the analysis server 18. Wherein, the analysis server 18 generates an analysis information of the target product by performing a data analysis based on the received wireless product tracking data S2 and the mobile product tracking data S3.

In the first embodiment of the present invention, the Bluetooth tracking device 12 can be configured on the target product for detecting a current state of the target product. When the target product is moved by a non-user, the motion detection sensor 121 of the Bluetooth tracking device 12 will detect the target product to be moved, and cause the Bluetooth tracking device 12 to transmit the product movement Bluetooth signal S1. The wireless base station 14 and the mobile 16 receive the product movement Bluetooth signal S1 respectively, and then transmit the wireless product tracking data S2 by the wireless base station 14 and transmit the mobile product tracking data S3 by the mobile device 16 to the analysis server 18 for analysis.

In addition, the motion detection sensor 121 configured on the target product detects a physical change of the environment at a certain frequency (for example, 50 times per second), when the physical change of the environment is smaller than the error range of the motion detection sensor 121, the target product will be regarded still, and when the physical change of the environment is bigger than the error range of the motion detection sensor 121, the Bluetooth tracing device 12 transmits more than one product movement Bluetooth signal S1. The product movement Bluetooth signal S1 comprises a unique sensor identity of the Bluetooth tracking device 12, and at least one sensed value of the motion detection sensor 121, wherein the sensed values can be replaced by an average method or a statistical method, and the product movement Bluetooth signal S1 can be transmitted by Bluetooth broadcast or Bluetooth connection.

In the practical application, the motion detection sensor 121 can be a gravity sensor, a linear accelerometer, a gyroscope, an angular velocity accelerator, an electronic compass, a magnetic sensor, an action sensor, an infrared sensor and any sensor which can be used to detect the moving items or to detect the physical changes of the moving items.

When the target product is moved, the read value of the motion detection sensor 121 of the Bluetooth tracking device 12 configured on the target product is changed, and then the program of the Bluetooth tracking device 12 is triggered to transmit one or more of the product movement Bluetooth signal S1, wherein, the product movement Bluetooth signal S1 comprises a sensor identity, at least one sensed value, and a trigger time. The sensor identity is a unique sensor identity of the Bluetooth tracking device 12. The sensed values are the sensed values of the motion detection sensor 121. The trigger time is the time at which the motion detection sensor 121 detects the time of the change trigger or the program of the Bluetooth tracking device 12 which transmits the product movement Bluetooth signal S1.

In addition, the wireless base station 14 can be a Bluetooth base station comprises a base station Bluetooth module 141 and a base station communication module 142. The base station Bluetooth module 141 is used for receiving the product movement Bluetooth signal S1 transmitted by the Bluetooth tracking device 12 and the wireless base station 14 establishes a network connection with the analysis server 18 through the Internet or Intranet by the base station communication module 142, wherein, the base station communication module 142 can be an Ethernet module, a WiFi wireless area network module, a wireless mobile communication protocol network module, a telephone dialing network module, a Power Line Communication (PLC) module for communication or other wired and wireless network modules that can be connected to the analysis server 18. The Bluetooth base station transmits the wireless product tracking data S2, wherein, the wireless product tracking data S2 comprises the received product movement Bluetooth signal S1, the trigger time, the Bluetooth received signal strength indicator (RSSI) of the base station Bluetooth module 141 received the product movement Bluetooth signal S1, and the unique identification code of the Bluetooth base station. If the trigger time of the product movement Bluetooth signal S1 does not coincide with the time received by the Bluetooth base station or the value is zero, the trigger time of the wireless product tracking data S2 can be set to the time that the Bluetooth base station receives the product movement Bluetooth signal S1.

In addition, the mobile device 16 comprises a mobile Bluetooth module 161, a mobile communication module 162 and a product tracking app 163. The mobile communication module can be a WiFi wireless area network module or a wireless mobile communication protocol module. When the target product is moved, the read value of the motion detection sensor 121 of the Bluetooth tracking device 12 configured on the target product is changed, and then the program of the Bluetooth tracking device 12 is triggered to transmit one or more of the product movement Bluetooth signal S1. After the mobile device 16 receives the product movement Bluetooth signal S1, the product tracking app 163 executed on the mobile device 16 establishes a network connection with the analysis server 18 through the Internet or Intranet by the mobile communication module 162 of the mobile device 16. The product tracking app 163 transmits the mobile product tracking data S3 to the analysis server 18 by the network connection, wherein, the mobile product tracking data S3 comprises the received product movement Bluetooth signal S1, the Bluetooth received signal strength indicator (RSSI) of the product movement Bluetooth signal S1 received by the mobile device 16, and a unique identification code of the mobile device 16. Wherein, the identification code of the mobile device 16 can be a mobile phone number, a mobile phone SIM card number, a mobile phone body number, a wireless area network Media Access Control (MAC) address, a mobile device unique sequence, a unique serial number provided by the mobile device operating system, or a unique code generated by the above number. If the trigger time of the product movement Bluetooth signal S1 does not coincide with the time received by the mobile device 16 or the value is zero, the trigger time of the mobile product tracking data S3 can be set to the time that the mobile device 16 receives the product movement Bluetooth signal S1.

In the practical application, the Bluetooth module comprised in the Bluetooth tracking device 12, the base station Bluetooth module 141, and the mobile device 16 can be any type of Bluetooth communication protocol specification defined by the Bluetooth Association, such as Bluetooth 2.0 communication protocol series, Bluetooth 3.0 protocol series or Bluetooth 4.0 communication protocol series defined by various Bluetooth devices. While the mobile device 16 can be a mobile phone, a PDA, or a smart wear device.

In addition, the popular product analysis system 1 of the present invention can interprets the Bluetooth received signal strength indicator (RSSI) by the product tracking app 163 of the mobile device 16. If the Bluetooth received signal strength indicator is greater than a set value, it is determined that the product movement Bluetooth signal S1 is triggered by the user of the mobile device 16, and then the network connection with the analysis server 18 is established and the mobile product tracking data S3 is transmitted. Using the received signal strength indicator (RSSI) and distance into a non-linear inverse relationship, the popular product analysis system 1 of the present invention judges whether the mobile device 16 is close to the Bluetooth tracking device 12 when the mobile device 16 receives one or more product movement Bluetooth signal S1. Wherein, the set value of the Bluetooth received signal strength indicator (RSSI) can be set to −50 Dbm but can vary by ±15 Dbm depending on the mobile device.

Wherein, the analysis server 18 generates an analysis information of the target product by performing a data analysis based on the received wireless product tracking data S2, the mobile product tracking data S3, and a database 181 of the analysis server 18.

Figure 3:
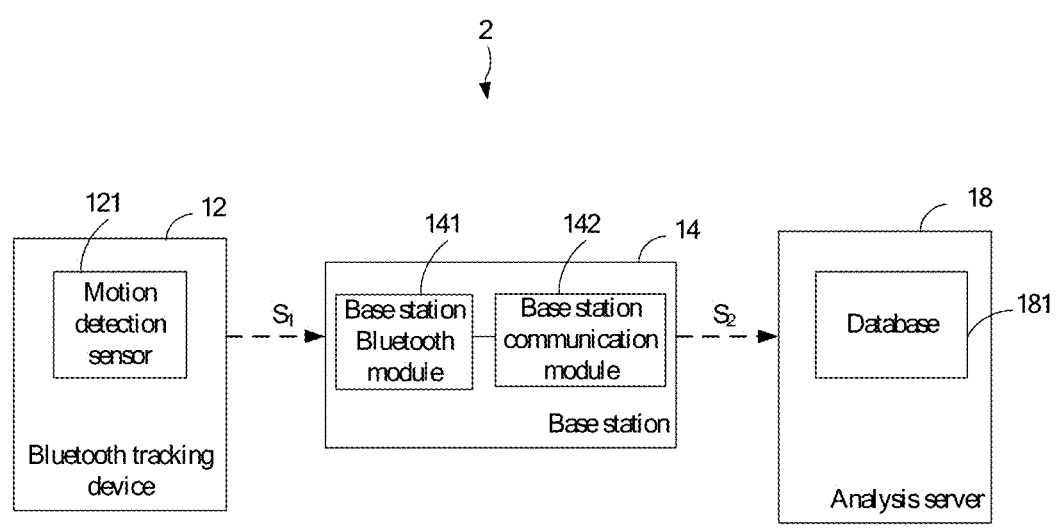
FIG. 3 shows a function block diagram of the second embodiment of the popular product analysis system of the present invention.

Please refer to FIG. 3. FIG. 3 shows a function block diagram of the second embodiment of the popular product analysis system 2 of the present invention. In the second embodiment of the present invention, the popular product analysis system 2 of the present invention comprises a Bluetooth tracking device 12, a wireless base station 14 and an analysis server 18. The Bluetooth tracking device 12 is configured on a target product comprising a motion detection sensor 121 for detecting the movement of the target product, wherein, the Bluetooth tracking device 12 transmits at least one product movement Bluetooth signal S1 when the target product is moved. The wireless base station 14 is configured around the target product for receiving the product movement Bluetooth signal S1 and transmitting a wireless product tracking data S2 to the analysis server 18. Wherein, the analysis server 18 generates an analysis information of the target product by performing a data analysis based on the received wireless product tracking data S2.

Figure 4:
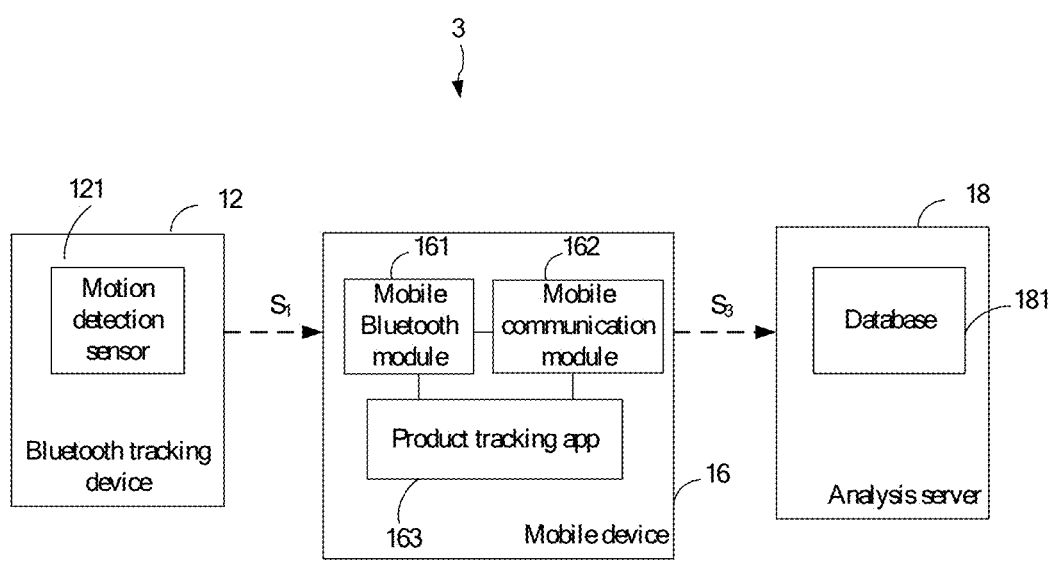
FIG. 4 shows a function block diagram of the third embodiment of the popular product analysis system of the present invention.

Please refer to FIG. 4. FIG. 4 shows a function block diagram of the third embodiment of the popular product analysis system 3 of the present invention. In the third embodiment of the present invention, the popular product analysis system 3 of the present invention comprises a Bluetooth tracking device 12, a mobile device 16 and an analysis server 18. The Bluetooth tracking device 12 is configured on a target product comprising a motion detection sensor 121 for detecting the movement of the target product, wherein, the Bluetooth tracking device 12 transmits at least one product movement Bluetooth signal S1 when the target product is moved. The mobile device 16 is for receiving the product movement Bluetooth signal S1 transmitted by the Bluetooth tracking device 12 when the target product is moved by the user of the mobile device 16, and transmitting a mobile product tracking data S3 to the analysis server 18. Wherein, the analysis server 18 generates an analysis information of the target product by performing a data analysis based on the received mobile product tracking data S3.

Wherein, the wireless product tracking data S2 can also be used to position the target product location. The analysis server 18 can utilize the Bluetooth received signal strength indicator of the wireless product tracking data S2 to convert to a distance to complete the triangulation method, the cellular positioning method, the proximity processing method, or other operations or simulations mode to position the target product to get a calculated product location. In the practical application, the calculated product location can be a relative coordinate of a field, a location code or other identifiable geographic location, wherein the location code is a code that represents a specific location area in a domain.

In the present embodiment, the data analysis program is as follows: the database 181 of the analysis server 18 comprises the user attribute of the mobile device 16, a target product data, an associated data, a product movement event data, and the product location data. The user attribute of the mobile device 16 in the database 181 comprises unique sensor identity of the mobile device 16, user code, gender, age, ethnicity, hobby, interest, sport, community, country, place of residence of one or more mobile devices, wherein the user code can be an identity card number, a driver's license number, a social security number, or a code that is automatically generated by the analysis server 18. The target product data comprises the description of the product such as product code, name, price, brief, promotional information, label and classification.

A mobile product tracking data S3 link user can be defined as follows: the unique sensor identity of any one of the mobile devices of the user attribute of the database 181 is the same as the unique sensor identity of the mobile device 16 of the mobile product tracking information S3, the user code of the user attribute is linked to the user of the mobile device 16 that transmits the mobile product tracking information S3.

A mobile product tracking data S3 link product can be referred to the product that is the product of the product movement Bluetooth signal S1 of the mobile product tracking data S3. A wireless product tracking data S2 link the product can be referred to the product that is the product of the product movement Bluetooth signal S1 of the wireless product tracking data S2. In the above embodiment, the sensor identity of the product movement Bluetooth signal S1 can be a product code, and the product movement Bluetooth signal S1 can link the product to define the product code. The sensor identity of the product movement Bluetooth signal S1 can also be the other sensor identities of the non-commodity code, wherein the analysis server 18 comprises a corresponding database for recording the correspondence between the other sensor identity and the product code. A product movement Bluetooth signal S1 link product can also be referred to a product code of the sensor identity of the product movement Bluetooth signal S1 corresponding the corresponding database.

In addition, the analysis server 18 performs the data analysis via the Bluetooth received signal strength indicator of the product movement Bluetooth signal S1 of the mobile product tracking information S3, the unique identification code of the mobile device 16, and the trigger time of the product movement Bluetooth signal S1 to obtain the relevance to the mobile device 16, and these product movement Bluetooth signals S1 for interpreting the relevance to a consumer and a product, wherein, the consumer is the user of the mobile device 16, and the product is the target product that the Bluetooth tracking device 12 transmitting the product movement Bluetooth signal S1 is configured on.

In the practical application, the associated data in the analysis server 18 comprises multiple sets of user product associations, and each user product association comprises a user, a target product, an association value of user and product, and an association category, wherein, the user is the user that the mobile product tracking data S3 linked, the target product is the product that the mobile product tracking data S3 linked, the association value of user and product can be a Bluetooth received signal strength indicator or a value deriving from the other Bluetooth received signal strength indication, and the association category is the signal strength. When the analysis server 18 receives a mobile product tracking data S3, the Bluetooth received signal strength indicator of the wireless product tracking data S2 is the association value of user and product. The association value of user and product can also be a distance estimate for the conversion of the Bluetooth received signal strength indication, and the association category is an intensity conversion distance or association value of user and product. Namely, it can be a distance estimated based on the Bluetooth received signal strength indicator of the wireless product tracking data S2. The distance estimate is based on the inverse of the received signal strength indicator (RSSI) and the distance. In the practical application, the association value of user and product takes the reciprocal of the distance estimate to conform to the nature—the higher the value, the higher the relevance.

In the practical application, the product movement event data of the analysis server 18 comprises multiple sets of product movement events. A product movement event is triggered by the analysis server 18 received a mobile product tracking data S3 or a wireless product tracking information S2. The product movement event comprises a target product, a start time, a duration, and an event type. The target product is linked by the mobile product tracking data S3 or the wireless product tracking information S2. The start time can be the time at which the analysis server 18 receives the mobile product tracking data S3 or the wireless product tracking information S2, and the start time can also be the trigger time of the mobile product tracking data S3 or the wireless product tracking information S2. The duration is a continuous time unit, and each time unit receives at least one the mobile product tracking data S3, wherein, the product of the mobile product tracking data S3 linked is the same as the target product, and the mobile product tracking data S3 is linked to the same user, or each time unit receives at least one wireless product tracking information S2, wherein, the product of the wireless product tracking information S2 linked is the same as the target product, and the time unit can be set to one second or multiple seconds. The event type is a mobile category or a wireless category, wherein, the mobile category is represented as a product movement event triggered by the mobile product tracking data S3, and the wireless category is represented as a product movement event triggered by the wireless product tracking data S2. The product movement events triggered by the mobile product tracking data S3 and the wireless product tracking data S2 are regarded as different product movement events.

A movement event is a product movement event with an event type of mobile category; a wireless event is a product movement event with an event type of wireless category. The user of a mobile event linked is the user of the mobile product tracking data S3 that triggered the mobile event, and the product of a mobile event linked is the linked product of the mobile product tracking data S3 that triggered the mobile event.

In the practical application, the data analysis method can be used to analyze the user attribute, the target commodity data, the related data, the product movement data and the product location data of the data database 181 in an interactive analysis to obtain an optimization analysis. Wherein, the optimization analysis can be a popularity of product, a relevance to the user and the product, a relevance to the location and commodity, a relevance to the user and the product location and target product and a transaction with the user and the product location and target commodity relevance, and a relevance to the transaction and the user and the product location and target product relevance, and the result of the optimization analysis used for generating a product furnishing and a time recommendation.

In the practical application, the wireless events and the mobile evens of the product movement event data can be compared. If a wireless event is the same as the target product, start time, and duration of a mobile event, the associated data of the analysis server 18 is added to an association value of user and product. The user of the product association is the user that is the mobile event linked; the target product is the product that is the mobile event linked. The association value with the user and the product is a maximum or a second largest value of a numerical range, and the association category is an event match, which can range from 0 to 1.0, 1 to 5, 1 to 10, or other numerical range.

If a wireless event is the same as the target product of a mobile event (the start time and duration are not completely coincident but partially overlap), the associated data of the analysis server 18 is added to an association value of user and product. The user of the association value of user and product is the user that is the mobile event linked. The target product is the product that is the mobile event linked. The association category is the event match. The association value of user and product is a proportion value within the range of the value. The proportion value can be obtained by an equation. The equation is the numerical range×f (overlap time)÷the duration of the wireless event; f (overlap time) is a weighting function that can be weighted for the value of the overlap time.

In the practical application, the product location data of the analysis server 18 comprises more than one product location combination, which comprises a location code, a product code, and a time interval; the location code can be a calculated product location and can also be entered by the a human interface provided by the analysis server 18. The product location can be provided by the analysis server 18 with a program interface (API) input by ERP, POS, or similar management system. The time interval is the time interval of the target product placed on the actual location corresponding to the location code. The target product is a product represented by a product code.

The associated data can also comprises multiple sets of location product associations, and each set of location product associations comprising a location code, a target product, a location product association value. The location product association value can be obtained by the following method; these wireless events of the product movement event within the analysis server 18, comparing with a linked product of the wireless event and a product code of the product location combination. It is determined whether or not the start time of the wireless event falls within the time interval of the product location combination. If both are satisfied, then add a fixed value in the location product association value of the product association of the associated data. The target product of the product association is the product that is the wireless event linked; the location code of the product association is equal to the location code of the product location combination. The fixed value can be an arbitrary positive number; actually take 1.0 for the fixed value.

The database 181 can add a product transaction information, and the product transaction information is imported or inquired by a POS or ERP system. The product transaction information comprises multiple sets of transaction records, and each group of the transaction record comprises a product code, a transaction amount, a transaction quantity, a transaction time, etc., wherein, the associated data can add multiple sets of location transaction association, and each set of location transaction associations comprises a location code, a product code, a location transaction association value. The location code of the product location combination can compare with the location code of the transaction records, and the transaction time of the transaction record can compare with the time interval of the product location combination. If the product code is the same and the transaction time falls in the time interval. The product code of the group location transaction association is equal to the product code of the transaction record. The location code of the group location transaction association is equal to the location code of the product location combination. If the group location transaction association already exists in the associated data, its location transaction association value can accumulate the transaction value of the transaction record for the location transaction association value of the transaction location, and the position transaction value can accumulate the transaction amount of the transaction record for the location transaction association value of the group location transaction association. The location transaction association value can also accumulate the transaction quantity of the transaction record for the location transaction association value of the group location transaction association. The location transaction value can also be the result of a weighted calculation of the transaction value association with the transaction quantity or the transaction amount, wherein, the weighted calculation is proportional to the transaction amount or the transaction quantity. If the group location transaction association does not exist in the associated data, the group location transaction association is added to the associated data. The location transaction association value of the location transaction association can be the transaction amount of the transaction record, the transaction quantity of the transaction record, or the result of a weighted calculation of the transaction quantity or the transaction amount, wherein, the weighted calculation is proportional to the transaction amount or the transaction quantity.

The associated data can also comprise multiple sets of user location product associations, and each user location product association comprises a user, a location code, a target product, a user location product association value. The user location product association value can be the result of a mathematical operation of the user product association value of the user product association with the location product association value of the location product association. The result of a mathematical operation is proportional to the user product association value, and the result of a mathematical operation is proportional to the location product association value. The mathematical operation can be a multiplication, a weighted operation, or other mathematical formula or algorithm. Wherein, the target product of the user product association and the product of the location product association are the same product or the same product code.

The associated data can also comprise multiple sets of transaction user location product association; each transaction user location product association comprises a user, a location code, a target product, a transaction user location product association value. The transaction user location product association value can be the result of a mathematical operation of the user location product association value of the user location product association with the location transaction association value of the location transaction association. The result of a mathematical operation is proportional to the user location product association value, and the result of a mathematical operation is proportional to the location transaction association value. The mathematical operation can be a multiplication, a weighted operation, or other mathematical formula or algorithm. Wherein, the target product of the user location product association and the product code of the location transaction association are the same product or the same product code, and the location code of the user location product association is the same as the location code of the location transaction association.

The data analysis method can be a sorting method for sorting the wireless event within the product movement event of the analysis server 18 in a time interval according to the number of occurrences of such wireless events to get the commodity hot ranking of time interval, and statistics of different time interval of product popularity, generating the product popularity of each time interval. The time interval can be a period of time in a day, a period of one week, a period of one month or a period of one year. Wherein, the sorting method can also be used to sort the relevance between users and products. The sorting method sorts the same product in the associated data of the server 18 with the user product association to get the relevance ranking of the user and the same product to identify users who are highly relevant to the same product. The sorting method can also be used to sort the location product association of the associated data. The sorting method sorts the product association value of a target product to get product location ranking, or sorts product association value of a product location to get the target product ranking of the product location. In a variety of rankings, the higher the sort position, the higher the relativity.

The data analysis method can also be a matrix factorization method for matrix factoring the associated data of the analysis server 18. The associated data of the analysis server 18 can form two dimensions of the two-dimensional matrix according to the user and the product, and the different associative categories form different matrices such as event matching matrices, signal strength matrices, strength conversion distance matrices, product location matrices, through the matrix factorization method to obtain a relevance to the user and the product.

The matrix factorization method of the above embodiments can refer to the following papers: MATRIX FACTORIZATION TECHNIQUES FOR RECOMMENDER SYSTEMS Yehuda Koren, Yahoo Research Robert Bell and Chris Volinsky, AT&T Labs—Research, Data Fusion by Matrix Factorization, Marinka Zitnik, and Blaˇz Zupan, Multi-Relational Matrix Factorization using Bayesian Personalized Ranking for Social Network Data, Artus Krohn-Grimberghe, Lucas Drumond, Christoph Freudenthaler, and Lars Schmidt-Thieme, Relation Prediction in Multi-Relational Domains using Matrix Factorization, Christoph Lippert, Stefan Hagen Weber, Yi Huang, Volker Tresp, Matthias Schubert, Hans-Peter Kriegel, Nonnegative Matrix Factorization for Spectral Data Analysis, V. Paul Pauca* J. Piper† Robert J. Plemmons, etc. In addition to the above data analysis methods, there can also be a variety of statistical methods, such as standard deviation method, regression analysis, correlation coefficient method, data mining and other knowing methods to carry out data analysis.

The product analysis method is used to obtain the product popularity, the relevance to the user and the product, the relevance to the location and the product, the relevance to the user and the product location and the target product and the relevance to transaction and the user and the product location and the target product.

The above embodiment can comprise an advertisement broadcasting system, and the advertisement broadcasting system can choose an advertisement massage to broadcasted according to the location of the mobile device 16, the product popularity, the relevance to the user and the product, the relevance to the location and the product, the relevance to the user and the product location and the target product and the relevance to transaction and the user and the product location and the target product. The target product of the advertisement massage is a target product highly relevant to the user, and the advertisement massage can be in the form of text or multimedia. The mobile device 16 can further comprise a GPS module and a WiFi wireless area network module. The mobile device 16 establishes a connection with the advertisement broadcasting system via the mobile wireless communication module 162. The advertisement broadcasting system obtains the position of the mobile device 16 by a positioning method via GPS, WiFi, Bluetooth, 3GPP defined wireless mobile network protocol. The positioning method can be the latitude and longitude coordinates of the GPS of the mobile device 16, the WiFi AP location information, the Apple iBeacon, the Google Eddystone, the base station location of the telecom operator, or the D2DProSE defined by the 3GPP to obtain the location of the mobile device 16. The advertisement broadcasting method can utilize the product tracking app 163, Apple iBeacon, Google Eddystone, or the advertisement broadcasting system and the Digital Signage Content Delivery System transmitting the advertisement massage to the Digital Signage near the mobile device 16.

The devices in the above embodiments comprise the wireless base station 14 and a unique sensor identity of the Bluetooth tracking device 12. The unique sensor identity of the Bluetooth tracking device 12 can be a Bluetooth MAC, a wired network MAC, a wireless network MAC, a mobile device ode, a mobile device SIM Card encoding, a serial number, or a unique identifier that is documented within the analysis server 18 for each device identification.

The wireless mobile communication protocol in the above embodiment is Release 4, Release 5, Release 6, Release 7, Release 8, Release 9, Release 10, Release 11, Release 12, Release 13, Release 14 of 3GPP Association, or other mobile telecommunications agreements approved by the ITU International Telecommunication Union.

The RSSI is in inverse relation to the distance. The present invention is mainly based on the following papers: Adaptive Distance Estimation Based on RSSI in 802.15.4 Network Miroslav BOTTA, Milan SIMEK. RSSI-based node localization algorithm for wireless sensor network Wanli Zhang * and Xiaoying Yang Intelligent Information Processing Lab, Suzhou University, Suzhou, Anhui, China, and are supplemented by other papers.

Compared with the prior art, the popular product analysis system of the present invention uses the analysis server to interpret the times and the time of the target product is moved corresponding to the store locations and types, and uses a mobile product tracking data transmitted by the mobile device or a wireless product tracking data transmitted by the wireless base station to analyze the popularity of the target product. The popular product analysis system of the present invention provides a proposal for the store to adjust the product location and the item, analyzes the attribute of the user of the mobile device, and broadcasts an advertisement message to the consumer by an advertisement broadcasting mechanism.

With the examples and explanations mentioned above, the features and spirits of the invention are hopefully well described. More importantly, the present invention is not limited to the embodiment described herein. Those skilled in the art will readily observe that numerous modifications and alterations of the device can be made while retaining the teachings of the invention. Accordingly, the above disclosure should be construed as limited only by the metes and bounds of the appended claims.

What is claimed is:

1. A popular product analysis system, comprising:
   an analysis server;
   a Bluetooth tracking device, configured on a target product, comprising a motion detection sensor for detecting the movement of the target product, wherein, the Bluetooth tracking device transmits at least one product movement Bluetooth signal when the target product is moved; and
   a wireless base station, configured around the target product for receiving the product movement Bluetooth signal and transmitting a wireless product tracking data to the analysis server;
   wherein, the analysis server generates an analysis information of the target product by performing a data analysis based on the received wireless product tracking data.

2. The popular product analysis system of claim 1 wherein the motion detection sensor can be a gravity sensor, a linear accelerometer, a gyroscope, an angular velocity accelerator, an electronic compass, a magnetic sensor, an action sensor, an infrared sensor and any sensor which can be used to detect the moving items or to detect the physical changes of the moving items.

3. The popular product analysis system of claim 1 wherein the product movement Bluetooth signal transmitted by the Bluetooth tracking device comprises a unique sensor identity of the Bluetooth tracking device, at least one sensed value of the motion detection sensor and a trigger time of the sensed values.

4. The popular product analysis system of claim 1 wherein the wireless base station comprises a base station Bluetooth module and a base station communication module, wherein the base station Bluetooth module is used for receiving the product movement Bluetooth signal transmitted by the Bluetooth tracking device and the wireless base station establishes a network connection with the analysis server through the base station communication module, and the wireless base station transmits the wireless product tracking data to the analysis server by the network connection, wherein, the wireless product tracking data comprises the received product movement Bluetooth signal and a unique identification code of the wireless base station.

5. The popular product analysis system of claim 4, wherein, if a trigger time of the product movement Bluetooth signal transmitted by the Bluetooth tracking device does not coincide with a time received by the wireless base station or the value is zero, the trigger time can be set to the time when the wireless base station receives the product movement Bluetooth signal by the wireless base station.

6. A popular product analysis system, comprising:
   an analysis server;
   a Bluetooth tracking device, configured on a target product, comprising a motion detection sensor for detecting the movement of the target product, wherein, the Bluetooth tracking device transmits at least one product movement Bluetooth signal when the target product is moved; and
   a mobile device, for receiving the product movement Bluetooth signal transmitted by the Bluetooth tracking device when the target product is moved by the user of the mobile device, and transmitting a mobile product tracking data to the analysis server;
   wherein, the analysis server generates an analysis information of the target product by performing a data analysis based on the received mobile product tracking data.

7. The popular product analysis system of claim 6 wherein the motion detection sensor can be a gravity sensor, a linear accelerometer, a gyroscope, an angular velocity accelerator, an electronic compass, a magnetic sensor, an action sensor, an infrared sensor and any sensor which can be used to detect the moving items or to detect the physical changes of the moving items.

8. The popular product analysis system of claim 6 wherein the product movement Bluetooth signal transmitted by the Bluetooth tracking device comprises a unique sensor identity of the Bluetooth tracking device, at least one sensed value of the motion detection sensor and a trigger time of the sensed values.

9. The popular product analysis system of claim 6 wherein the mobile device comprises a mobile Bluetooth module and a mobile communication module and executes a product tracking app, and the mobile Bluetooth module is used for receiving the product movement Bluetooth signal transmitted by the Bluetooth tracking device and the product tracking app establishes a network connection with the analysis server through the mobile communication module, and the mobile device transmits the mobile product tracking data to the analysis server by the network connection, wherein, the mobile product tracking data comprises the received product movement Bluetooth signal, a Bluetooth received signal strength indicator (RSSI) of the received product movement Bluetooth signal and a unique identification code of the mobile device.

10. The popular product analysis system of claim 9, wherein, if a trigger time of the product movement Bluetooth signal transmitted by the Bluetooth tracking device does not coincide with a time received by the mobile device or the value is zero, the trigger time can be set to the time when the mobile device receives the product movement Bluetooth signal by the mobile device.

11. The popular product analysis system of claim 10, wherein the analysis server performs the data analysis via the Bluetooth received signal strength indicator of the product movement Bluetooth signal, the unique identification code of the mobile device, and the trigger time of the product movement Bluetooth signal to obtain the relevance to the mobile device and these product movement Bluetooth signals for interpreting the relevance to a consumer and a product, wherein, the consumer is the user of the mobile device, and the product is the target product that the Bluetooth tracking device transmitting the product movement Bluetooth signal is configured on.

12. The popular product analysis system of claim 11, wherein the analysis server comprises a database and the database further comprises a user attribute and a product data.

13. The popular product analysis system of claim 12, wherein the user attribute and the product data of the database are used for performing a data analysis and the result of the data analysis is used for choosing an advertisement message to be broadcasted.

14. The popular product analysis system of claim 12, wherein the user attribute and the product data of the database are used for performing an optimal analysis, and the result of the optimization analysis can be used for generating a product furnishing and a time recommendation.

15. The popular product analysis system of claim 9, wherein the product tracking app executed on the mobile device interprets the Bluetooth received signal strength indication, if the Bluetooth received signal strength indicator is greater than a set value, it is determined that the product movement Bluetooth signal is triggered by the user of the mobile device, and then the network connection with the analysis server is established and the mobile product tracking data is transmitted.

16. A popular product analysis system, comprising:
an analysis server;
a Bluetooth tracking device, configured on a target product, comprising a motion detection sensor for detecting the movement of the target product, wherein, the Bluetooth tracking device transmits at least one product movement Bluetooth signal when the target product is moved;
a wireless base station, configured around the target product for receiving the product movement Bluetooth signal and transmitting a wireless product tracking data to the analysis server; and
a mobile device, for receiving the product movement Bluetooth signal transmitted by the Bluetooth tracking device when the target product is moved by the user of the mobile device, and transmitting a mobile product tracking data to the analysis server;
wherein, the analysis server generates an analysis information of the target product by performing a data analysis based on the received wireless product tracking data and the mobile product tracking data.

17. The popular product analysis system of claim 16 wherein the motion detection sensor can be a gravity sensor, a linear accelerometer, a gyroscope, an angular velocity accelerator, an electronic compass, a magnetic sensor, an action sensor, an infrared sensor and any sensor which can be used to detect the moving items or to detect the physical changes of the moving items.

18. The popular product analysis system of claim 16 wherein the product movement Bluetooth signal transmitted by the Bluetooth tracking device comprises a unique sensor identity of the Bluetooth tracking device, at least one sensed value of the motion detection sensor and a trigger time of the sensed values.

19. The popular product analysis system of claim 16 wherein the wireless base station comprises a base station Bluetooth module and a base station communication module, wherein the base station Bluetooth module is used for receiving the product movement Bluetooth signal transmitted by the Bluetooth tracking device and the wireless base station establishes a network connection with the analysis server through the base station communication module, and the wireless base station transmits the wireless product tracking data to the analysis server by the network connection, wherein, the wireless product tracking data comprises the received product movement Bluetooth signal and a unique identification code of the wireless base station.

20. The popular product analysis system of claim 16 wherein the mobile device comprises a mobile Bluetooth module and a mobile communication module and executes a product tracking app, and the mobile Bluetooth module is used for receiving the product movement Bluetooth signal transmitted by the Bluetooth tracking device and the product tracking app establishes a network connection with the analysis server through the mobile communication module, and the mobile device transmits the mobile product tracking data to the analysis server by the network connection, wherein, the mobile product tracking data comprises the received product movement Bluetooth signal, a Bluetooth received signal strength indicator (RSSI) of the received product movement Bluetooth signal and a unique identification code of the mobile device.

* * * * *